United States Patent [19]

Wood

[11] Patent Number: 4,971,343
[45] Date of Patent: * Nov. 20, 1990

[54] SHOPPING CART HAVING AN INFANT CARRIER AND AN INFANT CARRIER THEREFOR

[76] Inventor: Jerry Wood, 1713 Seifert Cir., Charlotte, N.C. 28205

[*] Notice: The portion of the term of this patent subsequent to May 30, 2006 has been disclaimed.

[21] Appl. No.: 316,030

[22] Filed: Feb. 27, 1989

Related U.S. Application Data

[63] Continuation-in-part of Ser. No. 230,903, Aug. 11, 1988, Pat. No. 4,834,404.

[51] Int. Cl.⁵ ............................................. B62D 39/00
[52] U.S. Cl. ............................................. 280/33.993
[58] Field of Search ...................... 280/33.992, 33.993, 280/30; 224/759, 158; 297/232, 233, 250; 403/109, 104

[56] References Cited

U.S. PATENT DOCUMENTS

| | | | |
|---|---|---|---|
| 1,245,354 | 11/1917 | Kirsch | 403/109 |
| 3,351,380 | 11/1967 | Sprague | 280/33.993 |
| 4,598,945 | 7/1986 | Hopkins | 280/33.993 |

Primary Examiner—Charles A. Marmor
Assistant Examiner—Richard Camby
Attorney, Agent, or Firm—Charles G. Lamb

[57] ABSTRACT

An infant carrier for attachment to a shopping cart includes an infant seat structure having a seat back and a seat bottom. The seat structure is to be disposed transversely across the shopping cart basket. Brackets are provided at the seat bottom for attaching the seat directly to the top edges of the two longitudinal sides of the shopping cart basket.

5 Claims, 2 Drawing Sheets

SHOPPING CART HAVING AN INFANT CARRIER AND AN INFANT CARRIER THEREFOR

CROSS REFERENCE TO RELATED APPLICATIONS

The present application is a continuation-in-part of co-pending application, Ser. No. 230,903, filed Aug. 11, 1988.

BACKGROUND OF THE INVENTION

The invention relates to infant carriers and more particularly to infant seats for use with conventional shopping carts.

Conventional shopping carts are typically equipped with a foldable structure including a pivotable frame which is pivotable from a folded position overlaying the back transverse end of the shopping cart basket to an unfolded position inwardly of the cart basket at an acute angle to the basket back end, and a pivotable shelf which is pivotable from a folded position overlaying the back transverse end of the shopping cart basket to an unfolded horizontal position extending between the basket back end and the unfolded frame. The foldable structure can function either as a compartment within the cart basket for holding small or fragile goods, or as a child's seat. A drawback of this foldable structure, when used as a child's seat, however, is that it forms a relatively upright seat which does not properly support an infant who has yet to develop strong enough muscles and muscle control to sit upright. In addition, these foldable structures are hard and uncomfortable for the infant seated therein.

There have been various proposals known to me which include fastening an infant seat to the basket of a shopping cart. In these proposals, however, the infant seat is positioned longitudinally of the shopping cart basket over the foldable structure discussed above, and is fastened to the push handle of the cart and to the pivoted frame of the foldable structure. Moreover, the infant seat either extends well over the top opening of the cart basket, thus, interfering with a clear access into the cart basket, or it extends well over the push handle of the shopping cart thereby interfering with the arms and handle of the person pushing the shopping cart. Additionally, the various proposals known to me for fastening an infant seat to a shopping cart are complicated in construction making them expensive to manufacture and difficult to use.

The present invention recognizes these drawbacks and provides a straight forward solution.

SUMMARY OF THE INVENTION

In one embodiment, the present invention provides an infant carrier for attachment to a shopping cart comprising a seat having a seat back and a seat bottom, the seat to be disposed transversely across the shopping cart basket, and bracket means on the seat bottom for attaching the seat to the top edges of the two longitudinal sides of the shopping cart basket.

In another embodiment, the present invention provides a shopping cart comprising a basket for containing goods including upstanding longitudinal sides and upstanding transverse end, an infant seat having a seat back and seat bottom disposed transversely across the basket, and brackets on the bottom for attaching the seat to the top edges of the longitudinal sides of the basket.

BRIEF DESCRIPTION OF THE DRAWINGS

A better understanding of the present invention will be had upon reference to the following description in conjunction with the accompanying drawings in which the numerals refer to like parts throughout and wherein.

DETAILED DESCRIPTION OF THE PREFERRED EMBODIMENT

Figure 1:
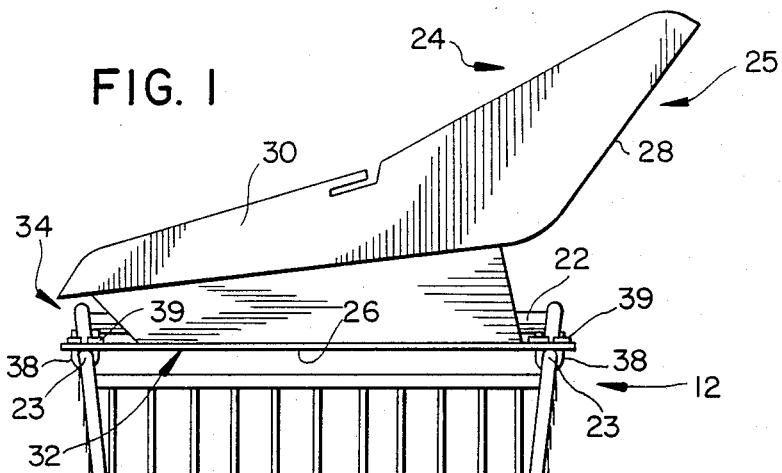
FIG. 1 is a front view of a portion of a shopping cart having an infant carrier.
Figure 2:
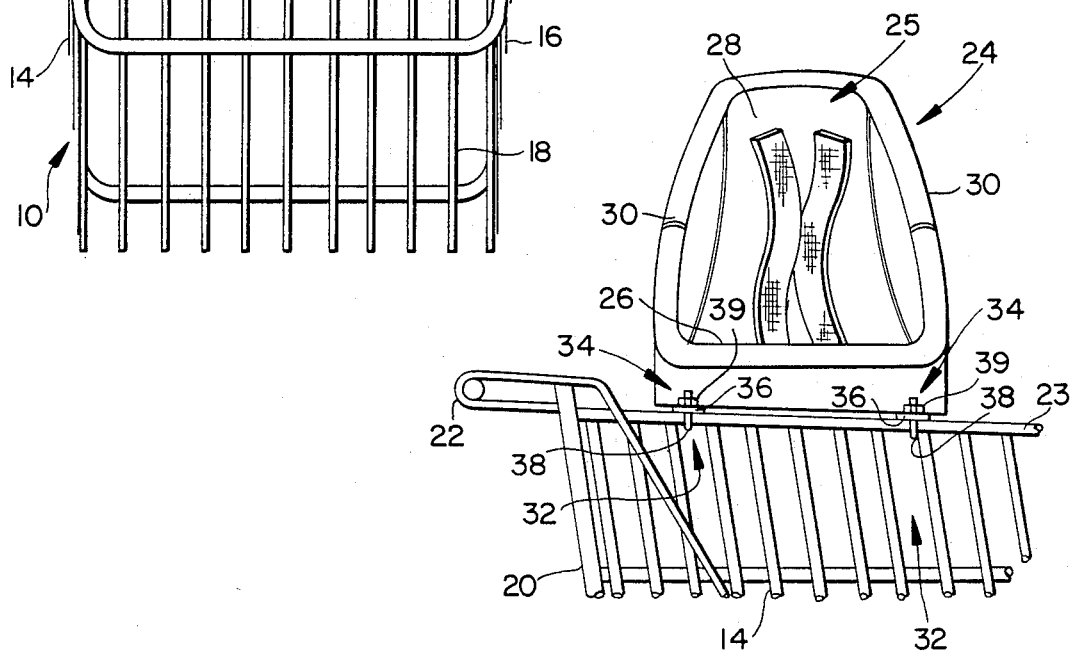
FIG. 2 is a side view of the portion of the shopping cart having the infant carrier of FIG. 1.

With reference to FIGS. 1 and 2, there is shown a portion of the basket 10 of a conventional shopping cart 12 for holding goods such as groceries and the like. The shopping cart basket 10 includes two upstanding spaced apart longitudinal sides 14 and 16, and two upstanding spaced apart transverse ends 18 and 20. The transverse end 20 is shown as being the back of the basket 10. The shopping cart 12 further includes a cart push handle 22 which extends in parallel spaced apart relationship to the cart back 20. Typically, the cart sides 14 and 16, and cart ends 18 and 20 are fabricated of crossed wires forming an open work with a heavier gage wire extending around the perimeter of the basket 10 forming the top edges 23 of the sides and ends while providing structural rigidity thereto.

Figure 3:
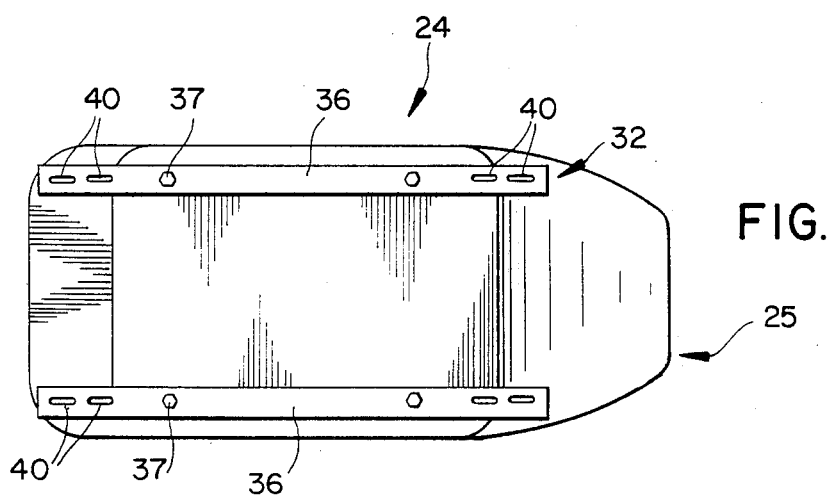
FIG. 3 is a bottom view of the infant carrier of FIGS. 1 and 2.

With continued reference to FIGS. 1 and 2, and additional reference to FIG. 3, there is also shown an infant carrier, generally denoted as the numeral 24, which includes a seat 25 having a seat bottom 26, a seat back 28 at one end of the seat bottom 26, and two spaced apart side walls 30 each descending from proximately the top end of the seat back 28 to the front end of the seat bottom 26. The infant carrier 24 also includes bracket means, generally denoted as the numeral 32, attached to the seat bottom 26 of the infant seat 25 and to the top edges 23 of the two longitudinal sides 14 and 16 of the shopping cart basket 10.

As can be best seen in FIGS. 1 and 2, when the infant carrier 24 is attached to the shopping cart 12 by bracket means 32, the infant seat 25 is disposed transversely across the width of the shopping cart basket 10. The bracket means 32 engage the top edges 23 of the longitudinal sides 14 and 16 of the shopping cart basket 10 thereby supporting the seat 25 directly on the longitudinal sides 14 and 16 of the shopping cart basket 10. As can be seen in FIGS. 2 and 3, the bracket means 32 projects forwardly beyond the seat bottom 26 and also projects rearwardly beyond the seat bottom 26. The bracket means 32 includes clamp means, generally denoted as the numeral 34, for fastening the bracket means 32 to the top edge 23 of the longitudinal sides 14 and 16 of the cart basket 10. The position of the clamp means 34, as shown, are adjustable along the extending or projecting portions of the bracket means 32 to enable the infant carrier to be fitted on shopping cart baskets 10 of different widths. As shown, the bracket means 32 includes a pair of parallel spaced apart longitudinally extending elongated rigid brackets 36 attached to the bottom surface of the seat bottom 26 by bolts 37. The overall length of each bracket 36 is slightly more than the width of the widest shopping cart basket 10 to which the infant carrier 24 would be mounted. It is contemplated that various different clamp means 34 can be used, however, the clamp means 34 should securely anchor the infant carrier 24 to the shopping cart 12 so that it can not be jarred loose from the shopping cart basket 10 during use. One such clamping means 34 comprises a U-shaped fastener 38, such as a U-bolt.

Each of the brackets 36 have at least one pair of holes 40 formed through its outwardly projection portions. The holes 40 are spaced apart from each other in the longitudinal direction of the elongated bracket 36. Each leg of a U-shaped fastener 38 is received in a different one of the holes 40 of a pair of holes in each outwardly projecting portion of the elongated bracket 36. The at least one pair of holes 40 may comprise a series of more than two holes spaced apart along the bracket 36 so that the location of the U-shaped fastener 38 along the length of the elongated bracket 36 can be changed by inserting the legs of the U-shaped fastener 38 in different ones of the holes 40 at different distances from the ends of the bracket 36 thereby adjusting the location of the U-shaped fasteners 38 on the elongated member 36 to accomodate shopping cart baskets 10 of different widths.

As shown best in FIG. 3, however, the holes 40 are elongated slots having there major axes extending longitudinally of the bracket 36 and in mutual alignment so that the location of the U-shaped fasteners 38 can be changed by sliding the legs of the U-shaped fasteners 38 along the major axes of the slotted holes 40. As shown in FIGS. 1 and 2, the ends of the legs of the U-shaped fasteners 38 can be formed with machine threads so that the U-shaped fasteners 38 can be secured to the bracket 36 by threading appropriate nuts 39 onto the legs.

The infant carrier 24 is positioned over the opening into the shopping cart basket 10 with the seat 25 disposed transversely across the shopping cart basket 10 with the elongated bracket 36 spanning the width of the shopping cart basket 10 and projecting end portions of the elongated bracket 36 engaging the top edge 23 of the longitudinal sides 14 and 16 of the shopping cart basket 10. The clamp means 34 are then secured to the top edge 23 of the longitudinal sides 14 and 16. As shown, the clamp means 34 being U-shaped fasteners 38, these U-shaped fasteners are each located to receive the heavy gage perimeter wire constituting the top edge 23 sides of an open work shopping basket 10 between the legs of the U-shaped fastener 38. Thusly, the top edge 23 is securely anchored between the U-shaped fastener 38 and the surface of the elongated brackets 36 engaged with the basket top edge 23.

Figure 4:
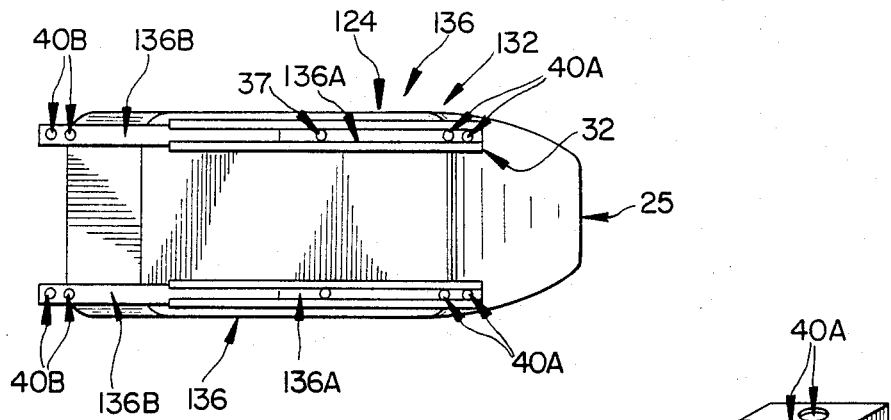
FIG. 4 is a bottom view of the infant carrier similar to FIG. 3, but showing a modification of the bracket means.
Figure 5:
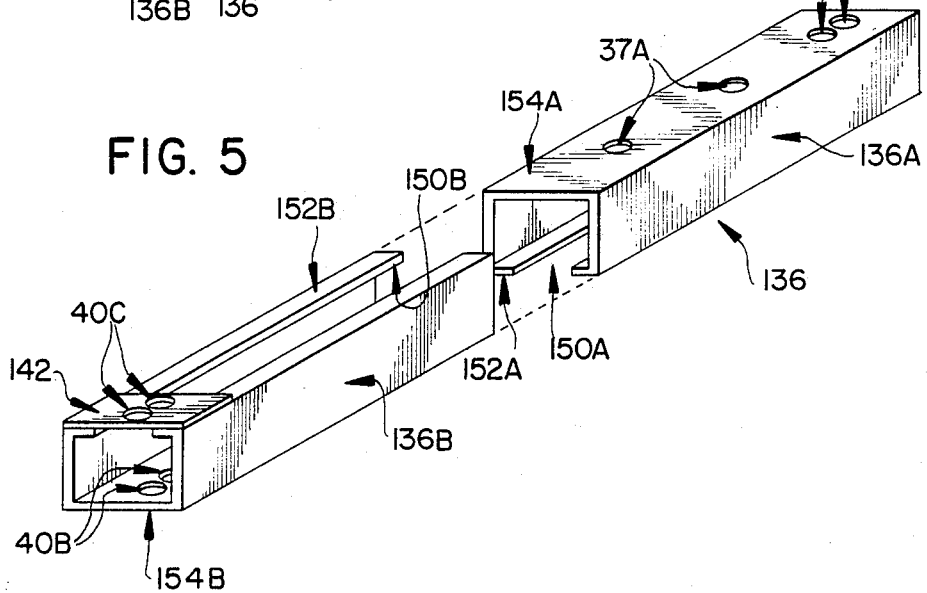
FIG. 5 is an exploded perspective view of one component of the infant carrier as shown in plane 5—5 in FIG. 4; and, FIG. 6 is a longitudinal cross-sectional view of the component of FIG. 5.
Figure 6:
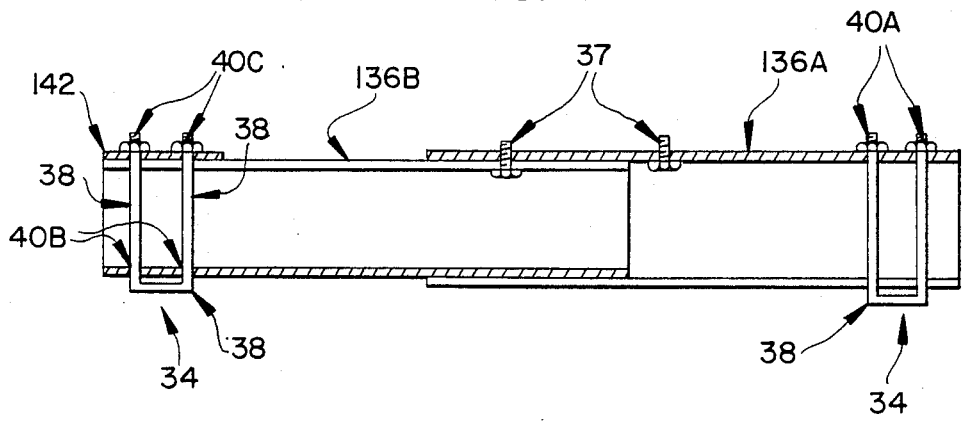

With reference to FIGS. 4, 5, and 6, there is shown another advantageous embodiment of an infant carrier, generally denoted as the numeral 124, to differentiate it from the infant carrier 24 of FIGS. 1–3. The infant carrier 124 is substantially identical to the infant carrier 24 and, therefore, in FIGS. 4, 5, and 6 the various components of the infant carrier 124 which are the same as the infant carrier 24 are denoted by identical numbers and, for the sake of brevity, the description thereof will not be repeated. The only difference between the infant carrier 124 and the infant carrier 24 is the bracket means which is denoted as the numeral 32 in FIGS. 1–3 for the infant carrier 24 and which is denoted as the numeral 132 in FIGS. 4, 5, and 6 for the infant carrier 124.

The bracket means 132 includes a pair of parallel spaced apart longitudinally extending rigid brackets 136 attached to the bottom surface of the seat bottom 26. Each of the brackets 136 includes two telescoping sections, outer bracket section 136A and inner bracket section 136B wherein the section 136B is slidably disposed within the section 136A. Each outer bracket section 136A projects forwardly beyond the front edge of the seat bottom 26 and is attached to the seat bottom 26 by bolts 37. The outer bracket sections 136A terminate a distance short of the back edge of the seat bottom 26. Each inner bracket section 136B moves freely longitudinally within its telescopically associated outer bracket 136A so that the overall length of each bracket 136 can be adjusted to properly fit the basket 10 of a shopping cart 12. The brackets 136 each include clamp means, generally denoted as the numeral 34, for fastening the brackets 136 to the top edge 23 of the longitudinal sides 14 and 16 of the cart basket 10. As shown, the clamp means 34 are associated with the distal end of the outer bracket section 136A and the distal end of the inner bracket section 136B of both brackets 136. As illustrated, the clamping means 34 comprises a U-shaped fastener 38 such as a U-bolt. The distal end of the outer bracket section 136A of each bracket 136 is provided with a pair of holes 40A spaced apart from each other in the longitudinal direction of the outer bracket section 136A, and the distal end of the inner bracket sections 136B of each bracket 136 is provided with a pair of holes 40B spaced apart from each other in the longitudinal direction of the inner bracket section 136B. Each pair of holes 40A and 40B receives a fastener 38 such that the fastener 34 depends from the bottom side of the bracket 136.

As can be best seen in FIGS. 5 and 6, the outer bracket section 136A is generally rectangularly shaped in transverse cross-section with a slot 150A running the length of the bracket, the slot 150A opening being in the bottom wall of the section 136A and the top wall 154A of the bracket section 136A being in abutment with the seat bottom 26 of the infant carrier 124. The inner bracket section 136B is also generally rectangularly shaped in transverse cross-section but is oriented with a longitudinally extending slot 150B in the top wall 152B. The slot 150B extends the entire length of bracket section 136B. The holes 37A in the outer bracket section 136A for the bolts 37 and the clamp holes 40A are formed through the top wall 54A. The inner bracket section 136B includes a plate 142 over the slot 150B at the distal end thereof. The clamp holes 40C are formed through the plate 142 and are aligned with the slot 150B. Clamp holes 40B are also provided through the bottom wall 154B of section 136B and are in alignment with holes 40C to receive U-shaped fasteners 38 therethrough.

The present invention provides a number of advantages over the prior art infant carriers known to me. The infant carrier of the present invention is more straightforward and simpler to install to a shopping cart basket. In addition, unlike the prior infant carriers, the present invention provides for mounting to a shopping cart basket 10 at vertually any location between the transversely disposed front end 18 and the transversely disposed back 20 of the shopping cart basket 10. This feature allows the positioning of the infant carrier so it will not cover the foldable structure, mentioned in the background of the invention which is usable for holding small packages or fragile goods. Even further, as can be best seen in FIG. 2, the infant carrier of the present invention does not interfere in any way with the shopping cart handle 22 nor the hands and arms of a person pushing the shopping cart. Still further, the infant carrier of the present invention covers a minimum of space over the open top of the shopping cart basket because it is transversely mounted to the shopping cart basket.

The foregoing detailed description is given primarily for clearness of understanding and no unnecessary limitations are to be understood therefrom for modifications will become obvious to those skilled in the art upon reading this disclosure and may be made without departing from the spirit of the invention or scope of the appended claims.

What is claimed is:

1. An infant carrier for attachment to a shopping cart basket having transverse sides and longitudinal sides, the infant carrier comprising:
   a seat having a back and a bottom, the seat being disposed transversely across the shopping cart basket in its attached condition; and,
   a pair of telescoping brackets in parallel spaced apart relationship, each of the brackets having two telescoping sections, one of the telescoping sections of each bracket being attached to the bottom of the seat and the other telescoping section of each bracket being freely telescopically associated with the telescoping section attached to the seat bottom, each bracket of the pair of telescoping brackets including means to attach the distal ends of the telescoping sections of each bracket to opposite longitudinal sides of said shopping cart basket.

2. The infant carrier of claim 1, further comprising clamp means associated with the distal ends of the telescoping section attached to the seat bottom and clamp means associated with the distal ends of the other telescoping section for engaging the top edges of the longitudinal sides of the shopping cart basket for supporting the seat directly on the longitudinal sides of the shopping cart basket.

3. The infant carrier of claim 1, wherein the telescoping bracket section attached to the seat bottom is an outer bracket section of the telescoping bracket, and the other bracket section is an inner bracket section of the telescoping bracket.

4. The infant carrier of claim 3, wherein:
   the outer bracket section is generally rectangular in transverse cross-section with a bottom wall and a top wall; and,
   the inner bracket section is generally rectangular in transverse cross-section with a bottom wall and a top wall.

5. The infant carrier of claim 4, wherein:
the outer bracket section includes an elongated longitudinally extending slot in the bottom wall and the top wall is in abutment with the seat bottom; and,
the inner bracket section includes an elongated longitudinally extending slot in the top wall, said top wall being in abutment with the seat bottom.

* * * * *